US010681049B2

(12) United States Patent
Jeuk et al.

(10) Patent No.: US 10,681,049 B2
(45) Date of Patent: Jun. 9, 2020

(54) AUTHENTICATION, AUTHORIZATION AND ACCOUNTING IN MANAGED CLOUD COMPUTING SERVICES

(71) Applicant: Cisco Technology, Inc., San Jose, CA (US)

(72) Inventors: Sebastian Jeuk, München (DE); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 16/036,805

(22) Filed: Jul. 16, 2018

(65) Prior Publication Data
US 2020/0021590 A1  Jan. 16, 2020

(51) Int. Cl.
*H04L 29/06* (2006.01)
*H04L 9/06* (2006.01)

(52) U.S. Cl.
CPC ........ *H04L 63/0892* (2013.01); *H04L 9/0637* (2013.01)

(58) Field of Classification Search
CPC .......................... H04L 63/0892; H04L 9/0637
(Continued)

(56) References Cited

U.S. PATENT DOCUMENTS 10,135,834 B1* 11/2018 Galebach .............. H04L 63/102
2018/0204213 A1* 7/2018 Zappier ................... H04L 63/08
(Continued)

*Primary Examiner* — Teshome Hailu
(74) *Attorney, Agent, or Firm* — Lee & Hayes, P.C.

(57) ABSTRACT

In an embodiment, a computer implemented method comprises receiving, at a first computing device associated with a managing entity, a request to perform an operation of a managed service; publishing to a first block of a distributed ledger system, by the first computing device associated with the managing entity, identification information of the managing entity; identifying, by a second computing device associated with the managed service, the identification information published to the first block of the distributed ledger system; publishing to a second block of the distributed ledger system, by the second computing device associated with the managed service, acknowledgement information comprising an indication that the identification information of the managing entity published to the first block was received and verified; publishing to a third block of the distributed ledger system, by the second computing device associated with the managed service, management request information comprising an operation request for the managing entity; identifying, by the first computing device associated with the managing entity, the management request information published to the third block of the distributed ledger system; publishing to a fourth block of the distributed ledger system, by the first computing device associated with the managing entity, management request acknowledgment information comprising an indication that the management request information of the third block was received; and in response to a performance of an operation included in the management request information published to the third block, publishing to a fifth block of the distributed ledger system, by the first computing device associated with the managing entity, management operation record information including a history of operations performed by the managing entity.

20 Claims, 4 Drawing Sheets

(58) Field of Classification Search
USPC .............................................................. 726/4
See application file for complete search history.

(56) References Cited

U.S. PATENT DOCUMENTS

2018/0293576 A1* 10/2018 Song .................... G06Q 20/401
2019/0236559 A1* 8/2019 Padmanabhan ........... G06F 8/51

* cited by examiner

AUTHENTICATION, AUTHORIZATION AND ACCOUNTING IN MANAGED CLOUD COMPUTING SERVICES

TECHNICAL FIELD

One technical field of the present disclosure relates to improved methods, systems, computer software, and/or computer hardware in the field of security for networked computers that are deployed in datacenters or remote "cloud" facilities. Another technical field is computer-implemented methods and systems for providing authentication, authorization, and accounting in a managed computer system without relying on third party entities or third-party applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Different computer system configuration have been provided to offer managed cloud services to customers. With managed cloud services, a provider of computing services has engineers who manage not only the customers' computing, storage, networks, and operating systems, but also the complex tools and application stacks that run on top of that infrastructure. In a managed cloud, it is paramount to provide a secure, traceable, and trusted computing environment via technical measures. Processes including authentication, authorization, and accounting, enforced by software or other technical elements, are considered important for effective network management and security. While solutions such as virtual private network (VPN) tunnels or secure shell (SSH) tunneling provide limited forms of accountability and trust, none provides traceability and trustability in a scalable way for use with hundreds of thousands of services or customers.

Traceability is traditionally accomplished through a log file storage system such as syslog, while trustability relies on key exchange systems such as public key infrastructure (PKI). Typically certificate authorities or other elements of PKI are independently operated by parties other than the cloud service provider or the customer. Both syslog and PKI encounter scalability issues when managing hundreds or thousands of different services and customers. In addition, while a third-party system such as syslog or PKI may be configured to work in limited circumstances, such systems are error prone and sensitive data can easily be compromised based on human error.

Therefore, there is a need for improved techniques that can provide authentication, authorization and accounting to a system that provides managed cloud services, but without relying on third party entities like PKI or third-party applications like syslog.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
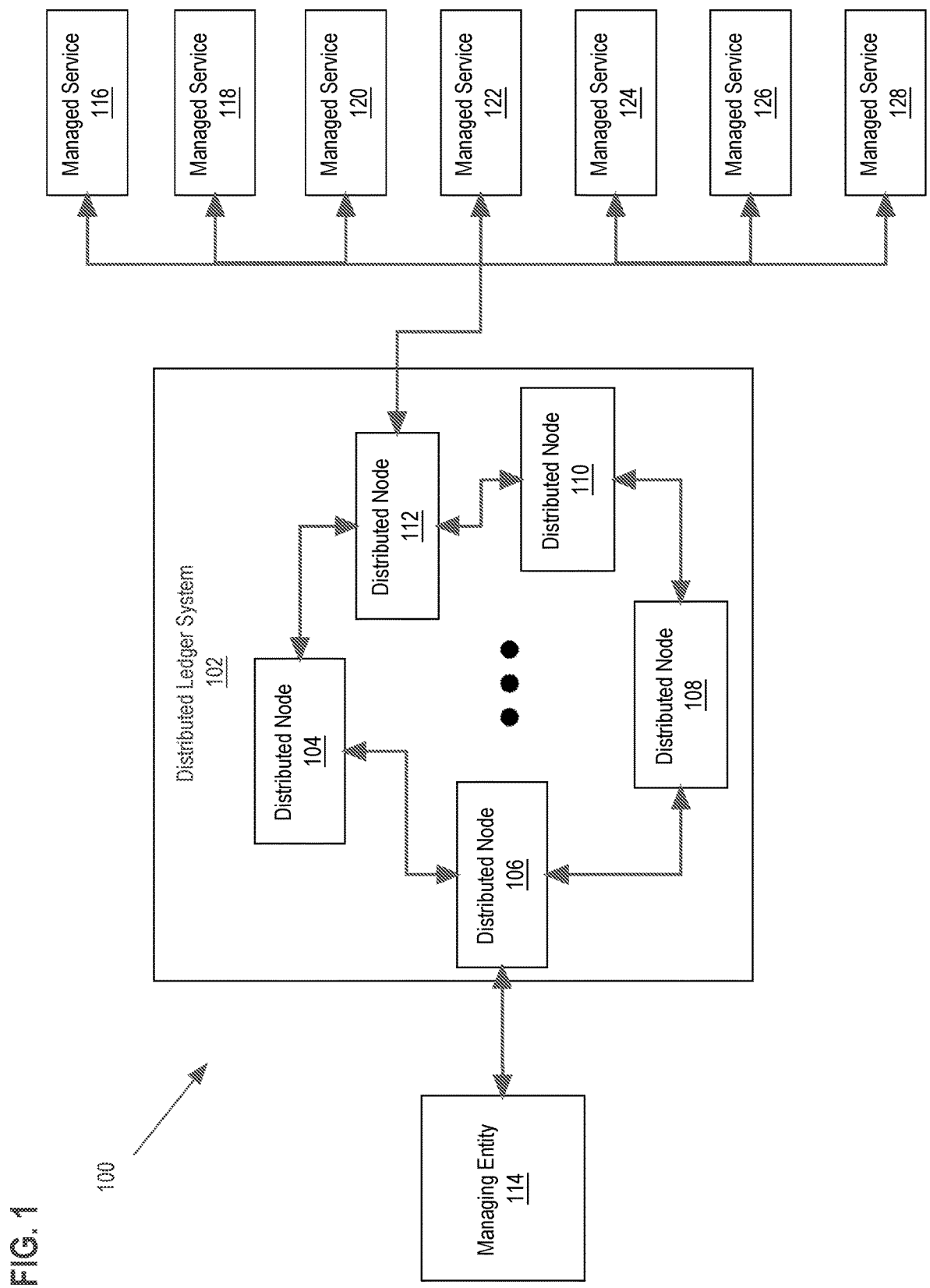
FIG. 1 depicts an embodiment of a distributed ledger system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

Embodiments are described herein in sections according to the following outline:

1.0 GENERAL OVERVIEW
2.0 STRUCTURAL OVERVIEW
3.0 PROCEDURAL OVERVIEW
4.0 TECHNICAL BENEFITS
5.0 HARDWARE OVERVIEW 1.0 General Overview Blockchain technology has been used in certain digital currency implementations. An example implementation and techniques are described in a 2008 article by Satoshi Nakamoto, titled "Bitcoin: A Peer-to-Peer Electronic Cash System" and other information about the structure, function and implementation of blockchain and distributed ledger software and computing systems is widely available in public sources.

In an embodiment, a blockchain is a data structure that stores a list of transactions and function as a distributed electronic ledger that records transactions between source identifier(s) and destination identifier(s). Every transaction is applied using a destination identifier, termed the "to" attribute, that is associated with a public/private key pair. In creating a new transaction, outputs from other, prior transactions that are to the "from" address are used as inputs for this new transaction. The "from" address may comprise which may be multiple different addresses derived from the same private key. The new transaction is then encumbered with the public key associated with the "to" destination identifier. That is, outputs from prior blockchain transactions are used as inputs for new transactions that are then signed using the public key associated with the destination address. The new blockchain transaction is then submitted to the blockchain. Once on the blockchain multiple such transactions are bundled into a block and the block is linked to a prior block in the "blockchain." Computer nodes of the distributed system then maintain the blockchain and validate each new block (along with the transactions contained in the corresponding block).

In an embodiment, the blockchain is used to facilitate authentication, authorization, and accounting processes in a managed cloud environment. By using the blockchain in this context, reliance on third party entities like PKI or third-party applications like syslog is eliminated, resulting in a maximized degree of trust and security between managed cloud participants.

In an embodiment, a computer implemented method comprises receiving, at a first computing device associated with a managing entity, a request to perform an operation of a managed service; publishing to a first block of a distributed ledger system, by the first computing device associated with the managing entity, identification information of the managing entity; identifying, by a second computing device associated with the managed service, the identification information published to the first block of the distributed ledger system; publishing to a second block of the distributed ledger system, by the second computing device associated with the managed service, acknowledgement information comprising an indication that the identification information of the managing entity published to the first block was received and verified; publishing to a third block of the distributed ledger system, by the second computing device associated with the managed service, management request information comprising an operation request for the managing entity; identifying, by the first computing device associated with the managing entity, the management request information published to the third block of the distributed ledger system; publishing to a fourth block of the distributed ledger system, by the first computing device associated with the managing entity, management request acknowledgment information comprising an indication that the management request information of the third block was received; and in response to a performance of an operation included in the management request information published to the third block, publishing to a fifth block of the distributed ledger system, by the first computing device associated with the managing entity, management operation record information including a history of operations performed by the managing entity.

In an embodiment, the distributed ledger system comprises a permissioned distributed ledger accessible by authorized entities, wherein the authorized entities comprise at least one of the managing entity or the managed service. In an embodiment, each block of the distributed ledger system comprises metadata indicating access control permissions. In an embodiment, each block of the distributed ledger system is accessible for a period of time specified in each respective block.

In an embodiment, the computer implemented method further comprises: allowing access to the management operation record information published to the fifth block of the distributed ledger system for a period specified in the fifth block.

In an embodiment, the computer implemented method further comprises: allowing access to the management operation record information published to the fifth block of the distributed ledger system for a period specified in the fifth block.

In an embodiment, performance of the operation comprises executing, by the managing entity, a cloud services operation on behalf of the managed service.

In an embodiment, the computer implemented method further comprises: in response to detecting an error related to the managed service, determining that the management operation record information published to the fifth block does not match the management request information published to the third block; in response to determining that the management operation record information published to the fifth block does not match the management request information published to the third block, generating a notification on the first computing device associated with the managing entity indicating an inconsistency between the management operation record information published to the fifth block and the management request information published to the third block.

In an embodiment, the computer implemented method further comprises: publishing to the first block of the distributed ledger system, by the first computing device associated with the managing entity, metadata including steps that need to be taken to perform the operation specified in the request to perform the operation the a managed service; and in response to identifying, by the second computing device associated with the managed service, the metadata of the first block of the distributed ledger system, publishing to the third block of the distributed ledger system, by the second computing device associated with the managed service, additional information including information required for the managing entity to adequately perform the operation request for the managing entity.

2.0 Structural Overview.

FIG. 1 illustrates a networked computer system in an example embodiment.

In an embodiment, a networked computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, DOCKER containers, virtual machine instances or virtual machine computing elements such as virtual processors, storage and memory, data centers, storage devices, desktop computers, laptop computers, mobile devices, and/or any other special-purpose computing devices. Any reference to "a computer" or "computing device" herein may mean one or more computers, unless expressly stated otherwise. The instructions identified herein are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between programmed computing devices such as devices associated with managing entity 114, devices of a distributed ledger system 102, and devices associated with managed services 116, 118, 120, 122, 124, 126, 128. Therefore, each of the elements of FIG. 1 may represent one or more computers that host or execute stored programs that provide the functions and operations that are described further herein in connection with managing entity services, managed service services and distributed ledger operations.

FIG. 1 depicts an embodiment of a distributed ledger system, which comprises a plurality of distributed nodes 104, 106, 108, 110, 112 and may be implemented by a plurality of computing devices. Distributed ledger system 102 represents a computing environment for operating a decentralized framework that maintains a distributed data structure, which may be referred to herein as a secure distributed transaction ledger or a blockchain. This secure distributed transaction ledger may support various functions, such as distributing computational tasks from one or more systems to one or more other systems, supporting methods of authentication, authorization, and accounting, among other functions.

To maintain the secure distributed transaction ledger among the various nodes 104, 106, 108, 110, 112 in the distributed ledger system, a set of procedures are followed. Generally, such a network would suffer from inherent uncertainty and distrust between the nodes when they transact because they are typically unaffiliated with each other, may be transacting across vast distances, may be transacting anonymously, and because there is no centralized control or management to monitor or to resolve disputes. However, because the ledger is maintained by each distributed node in the distributed ledger system and because it is maintained according to set procedures that employ cryptographic methods and a proof-of-work concept, the uncertain and distrust elements are mitigated.

Thus, in some embodiments, the secure distributed transaction ledger, or blockchain, is a ledger maintained collectively by the nodes in distributed ledger system 102. The blockchain includes blocks with data regarding recent transactions and/or messages, linking data that links one block to its previous block in the block chain, proof-of-work data that ensures that the state of the block chain is valid, and is endorsed by the majority of the record keeping systems. Furthermore, in embodiments, all confirmed transactions are included in the block chain and are done so using cryptography. This way, the integrity and the chronological order of the block chain are enforced and can be independently verified by each node.

In some embodiments, new transactions are added to the block chain using a distributed consensus system that confirms these pending transactions by including them in the block chain through a process commonly referred to as "mining." Mining enforces a chronological order in the blockchain and helps create and maintain integrity of the system. For transactions to be confirmed during the mining process, the transactions must be packed in a block and linked to the prior block, all according to a set procedure involving cryptography such as cryptographic checksums.

In some embodiments, data is received by one or more nodes in the distributed ledger system 102 for inclusion in the blockchain. This data is generally referred to as a "transaction' and is made available generally to the nodes in the distributed ledger system 102.

The initial concept of secure distributed transaction ledger, including cryptocurrency, was proposed in 2009 in a paper entitled "Bitcoin: A Peer-to-Peer Electronic Cash System." listing Satoshi Nakamoto as the author, which is incorporated by reference herein. Further details of maintaining and assuring the state of a secure distributed transaction ledger or blockchain are known in the art and shall not be discussed further herein.

In an embodiment, the distributed ledger system comprises a permissioned distributed ledger that is accessible by authorized entities. The distributed ledger system may prevent the publishing of the identification information of the managing entity to a block of the blockchain if the identification information is not authorized. In a permissioned distributed ledger system, users such as the managing entity and managed services must be enrolled in the distributed ledger system before they can perform transactions. The enrollment process gives users such as a managed entity and a managed service credentials that are used to identify the user when he or she performs transactions such as reading from the blockchain and publishing to the blockchain.

In an embodiment, each block of the distributed ledger system comprises metadata indicating access control permissions for managed entities and managed services. For example, access control permissions may determine whether a managing entity or managed services is permitted to view or read information published to the respective block. Additionally, access control permissions included in the metadata of one block may determine whether a managed entity or managed service is permitted to publish information to a next block. The metadata may specify credentials of each managing entity or managed service that can view or read information published to the respective block during a timeframe. When a managing entity or managed service attempts to read from the block, the managing entity or managed service must provide valid credentials in order to read the information included in the block.

In another embodiment, each block of the distributed ledger system is accessible only for a period of time specified in each respective block. For example, each block may specify a time frame that a managing entity or a managed service can only view or read information published to the respective block. The time specified in each respective block may be included as part of metadata in each block.

In another embodiment, each block of the distributed ledger system is accessible only from one or more physical locations specified in each respective block. For example, each block may specify physical locations that a managing entity or a managed service can view or read information published to the respective block from. Each block may specify physical locations that a managing entity or a managed service cannot view or read information published to the respective block from. Additionally, physical locations specified one block may determine whether a managed entity or managed service is permitted to publish information to a next block. The locations specified in each respective block may be included as part of metadata in each block. When a managing entity or managed service attempts to access a block, the distributed ledger system associated with the block may compare location information to the location information stored in each block to determine if the managing entity or managed service is permitted to access the block.

Returning to FIG. 1, one or more computing devices, such as a computer, mobile phone, tablet, or server may be configured to connect to the distributed ledger system to publish data to blocks of the blockchain, according to embodiments of the present invention. In various embodiments, the computing devices may be associated with a managing entity 114 or a managed service 116, 118, 120, 122, 124, 126, 128.

A managing entity 113 may be defined as a cloud system administrator who manages a managed service. Managing entities connect to managed services and perform operations on behalf of the managed services. A managed service 116, 118, 120, 122, 124, 126, 128 may be defined as a consumer that has a requirement that the managing entity manage their service. A service, in this context, may include any application deployed in a managed cloud environment. A managed service may be any system, application, or service that requires software development and software operation tasks. For example, a managed service can be as broad as a entire networked system (e.g. cloud computing system) or as specific as a micro-service. Additionally, a managed service can include forms of cloud computing such as IaaS, PaaS, and SaaS.

FIG. 1 depicts elements such as the managing entity 114 managed service 116, 118, 120, 122, 124, 126, 128, and distributed node 104, 106, 108, 110, 112 as finite amounts of computing elements. However, in other embodiments, more or fewer of the above referenced elements may accomplish the functions described herein.

Figure 2:
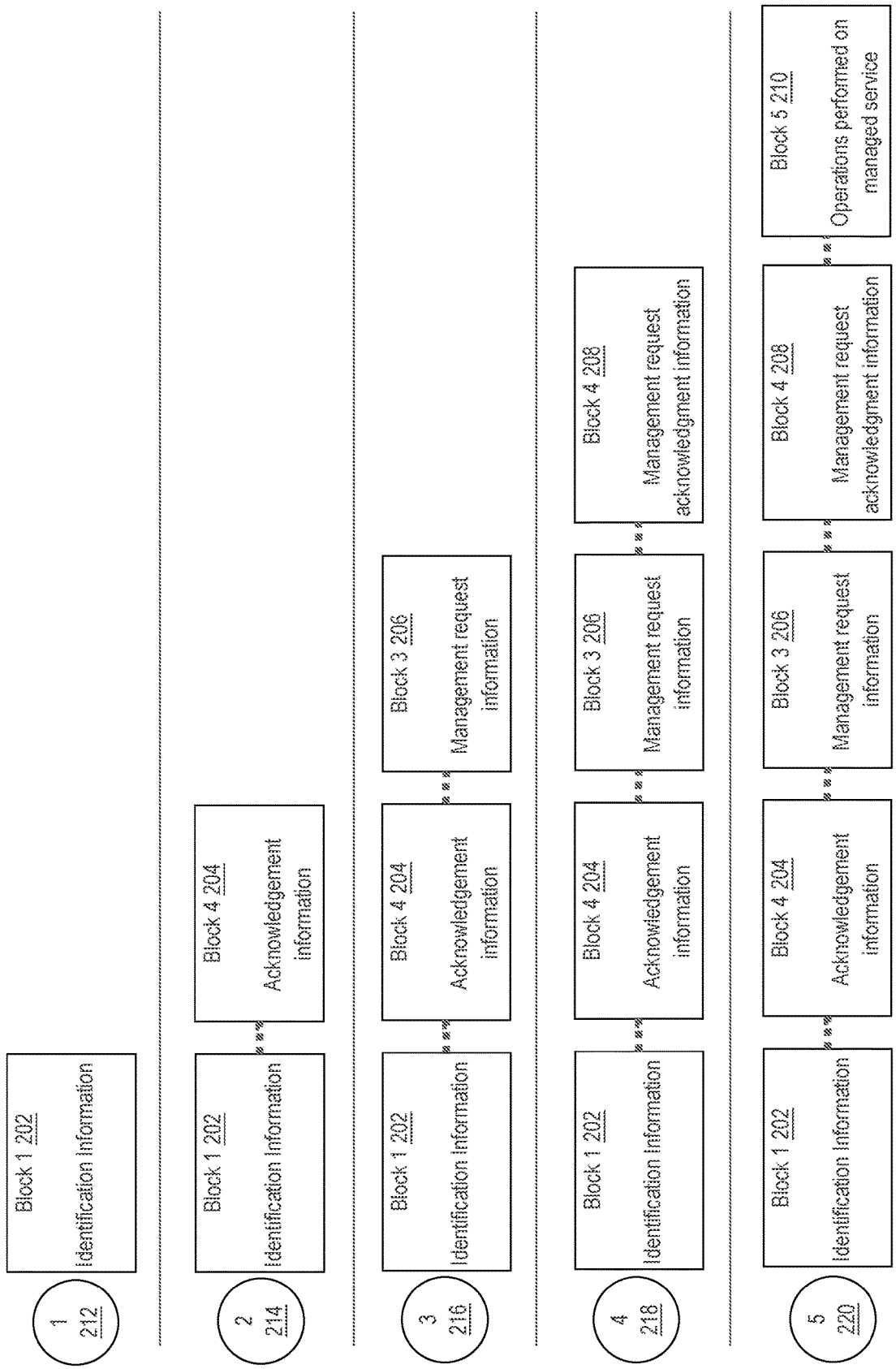
FIG. 2 depicts a chronological progression of digital data that is passed between a managing entity and a managed service via a distributed ledger system.

FIG. 2 depicts a chronological progression of digital data that is passed between a managing entity and a managed service via a distributed ledger system. For example, FIG. 2 shows an evolution of a blockchain over time as blocks are published to the blockchain. A first section 212 graphically depicts the state of the blockchain when a first block is published to the blockchain. A second section 214 graphically depicts the state of the blockchain when a second block is published to the blockchain. Sections 216, 218, and 220 graphically depict the state of the blockchain when a third, fourth, and fifth block, respectively, are published to the blockchain.

In some embodiments, a distributed ledger system may be used to communicate between a managing entity and a managed service.

In some embodiments, the blockchain may be used to receive digital data from or send digital data to a device or devices using the blockchain.

In an example embodiment, a distributed ledger system comprises a blockchain having blocks. The blockchain may include any number of blocks. In the example of FIG. 2, each block 202, 204, 206, 208, 210 may include its own index number, timestamp, data, hash, and hash of previous block.

The index number may be a numerical index that indicates the block's placement in the chain. The timestamp may be the date and time of when a block is created. The data may be an encrypted share stored in each block 202, 204, 206, 208, 210. The hash may be a hash of the encrypted share, such as an MD5 hash, SHA256 hash, or RIPEMD hash. The previous hash may be the hash of the previous block, which links the blocks in sequence. A block may store a record of previous hash. These records of previous hashes link each new block to the previous block to form a chain that allows for integrity checks of each block.

In various embodiments, the data stored in each block may comprise a unique identifier of the sender of the data (or owner/originator/sender of the data). This information may be used for one or more purposes. For example, the identifier helps a device that reads the ledger identify who published the data. The identifier of the publisher of the data also provides away by which a device can address a response to the sender, if desired. Additionally, the identifier of the owner/publisher may be used or linked to an account to pay for processing fees or other fees associated with using the blockchain as a communication channel, to perform computations, or other actions. Alternatively, a separate account identifier may be specified and used for payment purposes.

In various embodiments, the data may include instructions, such as configuration data, management data, and/or instruction-related data, for the device. In embodiments, this data may be a link to the configuration data, management data, and/or instruction-related data, or may be the data itself. In embodiments, the configuration data, management data, and/or instruction-related data may be a program, a container, or a link to data. In embodiments, a link to a program may comprise a unique identifier or an address to a program in the block chain, may be a link to an application or container available outside the block chain, or a combination thereof.

In various embodiments, the data may include a way or ways for authenticating the data. For example, in some embodiments, the data may include a digitally signed message checksum as way to verify the data. For example, the publisher of the data may digitally sign a checksum or hash of the data using his or her private key. A receiving device can verify the integrity of the data by verifying the checksum or hash using the publisher's public key. Those having skill in the art shall recognize that other methods for verifying the data's integrity may also be employed herein.

3.0 Procedural Overview

Figure 3:
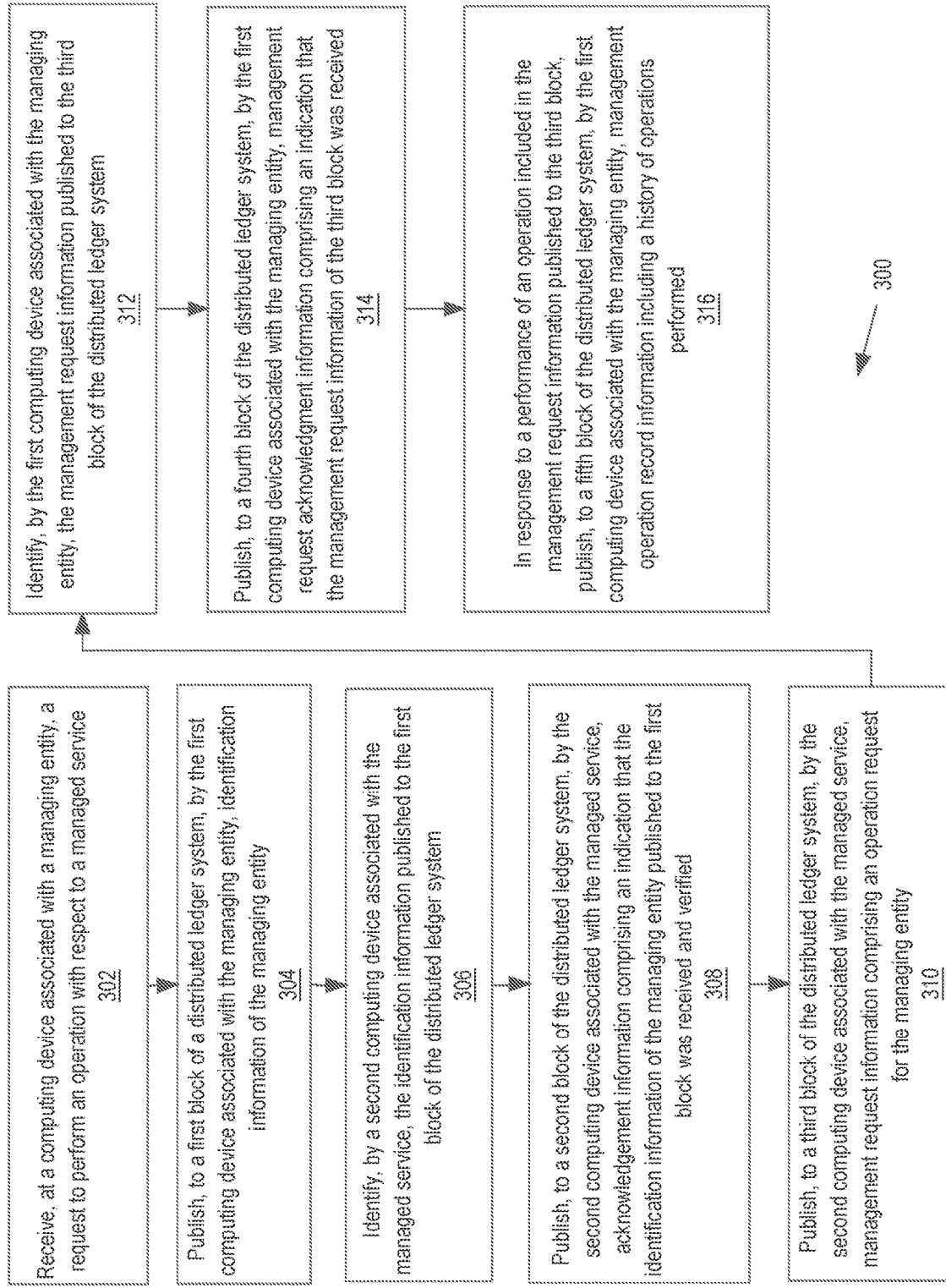
FIG. 3 depicts a method or algorithm for providing authentication, authorization, and accounting in a managed system without relying on third party entities or third-party applications, in an example embodiment.

FIG. 3 depicts a method or algorithm for providing authentication, authorization, and accounting in a managed system without relying on third party entities or third-party applications, in an example embodiment. FIG. 3 is described at the same level of detail that is ordinarily used, by persons of skill in the art to which this disclosure pertains, to communicate among themselves about algorithms, plans, or specifications for other programs in the same technical field. While the algorithm or method of FIG. 3 shows a plurality of steps providing authentication, authorization, and accounting in a managed system, the algorithm or method described herein may be performed using any combination of one or more steps of FIG. 3 in any order, unless otherwise specified.

For purposes of illustrating a clear example, FIG. 3 is described herein in the context of FIG. 1 and FIG. 2, but the broad principles of FIG. 3 can be applied to other systems having configurations other than as shown in FIG. 1. Further, FIG. 4 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 3 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

At step 302, a request to perform an operation with respect to a managed service is received at a computing device associated with a managing entity. For example, as discussed above with respect to FIG. 1, a request to perform an operation with respect to a managed service may be received at a computing device associated with managing entity 114 via a network.

In an embodiment, a request to perform an operation with respect to a managed service comprises a request for a managing entity to initiate and complete a cloud services operation. Cloud services operations may include any operation encompassing managing and delivering cloud services and infrastructure to a managed service. For example, a cloud services operation may include updating a database software instance on a managed service, installing new software or firmware on a managed service, troubleshooting errors associated with a managed service application, general maintenance operations, and troubleshooting operations.

At step 304, identification information of the managing entity is published to a first block of a distributed ledger system by the first computing device associated with the managing entity. For example, as discussed above with respect to FIG. 1 and FIG. 2, a computing device associated with the managing entity 114 publishes identification information to block 202 of the blockchain associated with the distributed ledger system 102. The identification information comprises digital data that identifies the managing entity 114 and may include a unique identifier of the publisher of the data. This information may be used for one or more purposes, further discussed herein, such as helping the receiving device identify who published the identification information.

In an embodiment, in addition to the identification information, metadata is published to the first block of a distributed ledger system by the first computing device associated with the managing entity. The metadata may include information that is related to the request to perform an operation specified in step 302. The metadata may specify tasks or steps that are required to be completed to perform the operation specified in the request. The metadata may be useful as a blueprint for tasks or steps that need to be taken to complete an operation so that the actual tasks executed, or steps taken can later be compared to the tasks or steps specified in the metadata. For example.

Metadata integrated as part of the distributed ledger can be of different variety and purpose. The metadata can be used to specify service request information, pro-active task information (i.e. if an update is rolled out, what is updated, what is impacted, etc.). The metadata may include requirements for a servicing task up front so that any subsequent information can be compared against the task so that requirements can be verified. The success of a performed task can be evaluated based on the requirements defined within the metadata section. This helps eliminating and detecting tasks that have not been agreed upon in case of failures, data loss, and breaches.

In an embodiment, metadata may include a request for more information about the requested operation from the managed service. For example, if the managing entity requires further information to adequately service the request to perform an operation received in step 302, the managing entity may include a request for more information about the requested operation from the managed service in the metadata that is published to the first block.

At step 306, the identification information published to the first block of the distributed ledger system is identified by a second computing device associated with the managed service. For example, as discussed above with respect to FIG. 1 and FIG. 2, a computing device associated with the managed service identifies the identification information published to block 202 of the blockchain associated with the distributed ledger system 102. Identifying the identification information from block 202 of the blockchain may comprise reading or accessing block 202 of the blockchain in the distributed ledger system 102.

At step 308, acknowledgement information comprising an indication that the identification information of the managing entity published to the first block was received and verified is published to a second block of the distributed ledger system by the second computing device associated with the managed service. For example, as discussed above with respect to FIG. 1 and FIG. 2, a computing device associated with the managed service publishes acknowledgement information to block 204 of the blockchain associated with the distributed ledger system 102. The acknowledgement information comprises digital data providing an indication that the identification information of the managing entity of block 204 was received and verified.

In an embodiment, in response to identifying the identification information of the first block of the distributed ledger system, the second computing device associated with the managed service verifies the identification information of the managing entity. For example, the second computing device associated with the managed service may verify the identification information by querying a database to determine if the identification information matches stored identities of verified managing entities. Those having skill in the art shall recognize that other methods for verifying the identification of an entity may also be employed herein.

At step 310, management request information comprising an operation request for the managing entity is published to a third block of the distributed ledger system by the second computing device associated with the managed service. For example, as discussed above with respect to FIG. 1 and FIG. 2, a computing device associated with the managed service publishes management request information to block 206 of the blockchain associated with the distributed ledger system 102. The management request information comprises an operation request for the managing entity.

In an embodiment, an operation request comprises a request for a managing entity to initiate and complete a cloud services operation. Cloud services operations may include any operation encompassing managing and delivering cloud services and infrastructure to a managed service. For example, a cloud services operation may include updating a database software instance on a managed service, installing new software or firmware on a managed service, troubleshooting errors associated with a managed service application, general maintenance operations, and troubleshooting operations.

In an embodiment, in response to identifying metadata that includes a request for more information about the requested operation, additional information about the requested operation is published to the third block of the distributed ledger system by the second computing device associated with the managed service. The additional information about the requested operation may include information related to the request for more information that was published to the first block by the managing entity. For example, the additional information may include missing information that is required for the managing entity to adequately perform the operation requested by the managed service in step 302.

Thus, the management request information including an operation request for the managing entity may serve as a formal request that is securely published and recorded to the blockchain and may be accompanied by additional information that provides specifics about the requested operation.

At step 312, the management request information published to the third block of the distributed ledger system is identified by the first computing device associated with the managing entity. For example, as discussed above with respect to FIG. 1 and FIG. 2, a computing device associated with the managing entity identifies the management request information published to block 206 of the blockchain. Identifying the management request information from the third block 206 of the blockchain may comprise reading or accessing block 206 of the blockchain in the distributed ledger system 102.

At step 314, management request acknowledgment information comprising an indication that the management request information of the third block was received is published to a fourth block of the distributed ledger system by the first computing device associated with the managing entity. For example, as discussed above with respect to FIG. 1 and FIG. 2, a computing device associated with the managing entity publishes management request acknowledgment information to block 208 of the blockchain. The management request acknowledgment information comprises an acknowledgment indicating that the management request information of the third block was received by the managing entity.

In an embodiment, in response to identifying the management request information of the third block of the distributed ledger system, the first computing device associated with the managing entity verifies the management request information provided by the managing entity. For example, the first computing device associated with the managing entity may query a database to verify that the operation request included in the management request information is a valid operation that the managing entity is permissioned to perform on behalf of the managed service. Those having skill in the art shall recognize that other methods for verifying the validity of an operation request may also be employed herein.

At step 316, in response to a performance of an operation included in the management request information published to the third block, management operation record information including a history of operations performed is published to a fifth block of the distributed ledger system by the first computing device associated with the managing entity.

In an embodiment, performing an operation comprises the managing entity executing a cloud services operation on behalf of the managed service. In an embodiment, history of operations performed includes operations performed by the managing entity in response to operation requests, including operation requests published to the blockchain as discussed in step 310. Further operations performed by the managing entity on behalf of the managed service may be recorded in additional blocks of the blockchain.

As discussed above, each block of the distributed ledger system may be accessible only for a period of time specified in each respective block. Metadata included in each block may further specify which pieces of data included in the block are accessible during specified time frames and may also specify credentials associated with a particular managing entity or managed service that certain pieces of data are accessible to. In an embodiment, access is permitted to the management operation record information of the fifth block of the distributed ledger system only for a period that is specified in the fifth block. Additionally, each block of the distributed ledger system may be accessible only from one or more physical locations specified in each respective block.

In an embodiment, in response to detecting an error related to the managed service, determining that the management operation record information published to the fifth block does not match the management request information published to the third block. In response to determining that the management operation record information published to the fifth block does not match the management request information published to the third block, generating a notification on the first computing device associated with a managing entity indicating an inconsistency between the management operation record information published to the fifth block and the management request information published to the third block.

For example, a managing entity or managed service may detect an error related to the managed service such as a software bug or malfunctioning application associated with the managed service. A managing entity or managed service may read the blocks of the blockchain and determine that the management operation record information published to the fifth block does not match the management request information published to the third block. In response, a managing entity or managed service may generate and transmit alerts, notifications, recommendations and other information to a managing entity or managed service that include information relating to the identified inconsistency between the management operation record information published to the fifth block and the management request information published to the third block. Such alerts, notifications, recommendations and other information may be useful to begin troubleshooting procedures so that the error related to the managed service can be resolved.

4.0 Technical Benefits

In certain example embodiments, a managing entity and managed service interact with a blockchain. The system advantageously provides cryptographically safe storage and immutability for the records that are stored on the blockchain. The system allows for a complete history of transactions (e.g., a chain of transactions). In certain example embodiments, cryptographic signing may be required or used to facilitate the request and performance of cloud service operations.

Since each block of a distributed blockchain contains a hash of the previous block before it, any unauthorized changes to data within the blockchain produces changes in the hash of each block in the chain. Therefore, unauthorized changes can easily be detected through the use of blockchains. Moreover, all changes to security service information are first approved by a consensus network of computers, which protects the integrity of the blockchain data.

The use of the blockchain allows for consensus confirmation (e.g., via mining) of submitted transaction before they may be considered "committed" to the cryptographic ledger that is represented by the blockchain. The records on the blockchain may then provide a shared view of data components included as part of the authentication, authorization, and accounting processes across workflow participants such as managing entities and managed services. In certain example embodiments, the use of the blockchain to store data components included as part of the authentication, authorization, and accounting processes may provide for an immutable, agreed upon view (or record) of workflow between managing entities and managed services. Such an implementation may thus decrease the cost of replication across databases and provides absolute verifiability of logged transactions.

When conventional techniques to accomplish authentication, authorization, and accounting are used in managed cloud service systems, it may be difficult or infeasible to efficiently distribute key pairs so that the system can be secured. For example, in context of managed cloud services, using PKI requires that each entity needs one key to access each managed service. In cloud deployments where scalability to hundreds or thousands of entities and services is paramount, security implementations such as PKI hinder growth and overcomplicate the security process by requiring a third party to help manage hundreds, if not thousands of keys. Additionally, sensitive data can easily be compromised based on human error.

These issues are addressed by utilizing a permissioned private blockchain to facilitate the authentication, authorization, and accounting processes in a managed cloud services workflow. Instead of storing and keeping track of hundreds of key pairs, a permissioned private blockchain keeps track of permissioned users and provides simplicity in allowing permissioned users to access the ledger using a single key. For example, managing entities can access the ledger using their private key and communicate with hundreds or thousands of managed services by publishing information to the ledger. This implementation saves storage space by storing less keys and speeds up the cloud services workflow by providing nearly instantaneous, secure transactions with the blockchain.

Furthermore, several layers of security are added by the implementations discussed herein. Not only is the blockchain permissioned, in that only certain users with select credentials can read or write to the blockchain, and private, in that distributed ledger system is only shared between trusted entities and not made available to the public, but the implementation discussed herein provides further layers of security. For example, each block of the blockchain may specify access control limits, which control who can access each block and what data written to the block they can access. Additionally, further criteria such as limiting access to a block based on the location of the connecting user and only allowing access to a block within a certain time frame can further enhance the security of the ledger.

Thus, the above discussed implementations eliminate the need for third party entities and third-party applications to accomplish authentication, authorization, and accounting processes. Eliminating third parties provides a new degree of security that is essential to the efficiency of managed cloud services. The technical features described herein may thus improve the security, verifiability, and reliability of authentication, authorization, and accounting processes in context of managed cloud services.

5.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
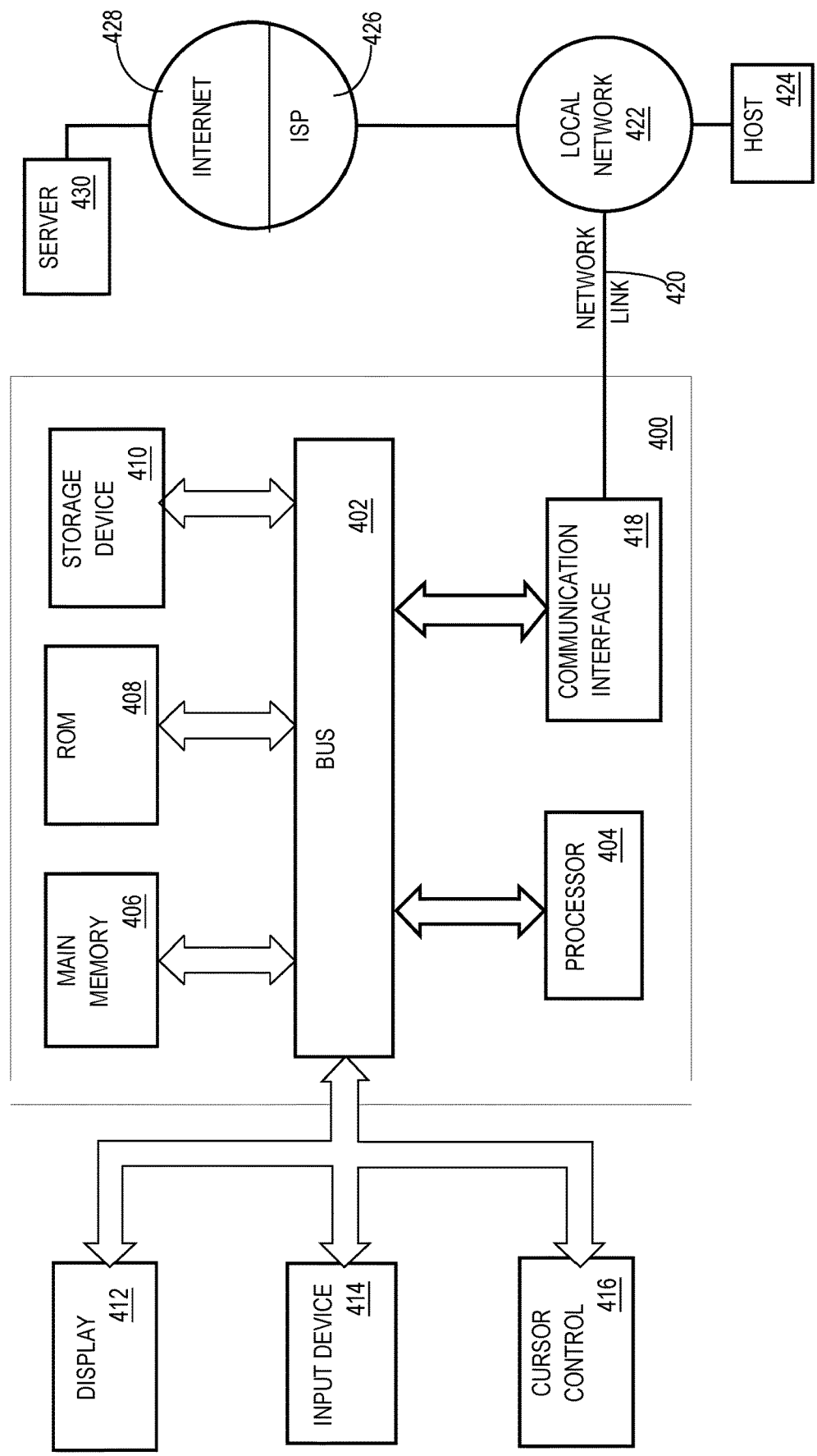
FIG. 4 depicts a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method, comprising:
   receiving, at a first computing device associated with a managing entity, a request to perform an operation of a managed service;
   publishing to a first block of a distributed ledger system, by the first computing device associated with the managing entity, identification information of the managing entity;

identifying, by a second computing device associated with the managed service, the identification information published to the first block of the distributed ledger system;

publishing to a second block of the distributed ledger system, by the second computing device associated with the managed service, acknowledgement information comprising an indication that the identification information of the managing entity published to the first block was received and verified;

publishing to a third block of the distributed ledger system, by the second computing device associated with the managed service, management request information comprising an operation request for the managing entity;

identifying, by the first computing device associated with the managing entity, the management request information published to the third block of the distributed ledger system;

publishing to a fourth block of the distributed ledger system, by the first computing device associated with the managing entity, management request acknowledgment information comprising an indication that the management request information of the third block was received; and in response to a performance of an operation included in the management request information published to the third block, publishing to a fifth block of the distributed ledger system, by the first computing device associated with the managing entity, management operation record information including a history of operations performed by the managing entity.

2. The method of claim 1, wherein the distributed ledger system comprises a permissioned distributed ledger accessible by authorized entities, wherein the authorized entities comprise at least one of the managing entity or the managed service.

3. The method of claim 1, wherein the request to perform the operation comprises a request for the managing entity to initiate and complete a cloud services operation.

4. The method of claim 1, wherein each block of the distributed ledger system comprises metadata indicating access control permissions.

5. The method of claim 1, wherein each block of the distributed ledger system is accessible for a period of time specified in each respective block.

6. The method of claim 1, further comprising allowing access to the management operation record information published to the fifth block of the distributed ledger system for a period specified in the fifth block.

7. The method of claim 1, further comprising restricting access to each block of the distributed ledger system to a physical location that is specified in each respective block.

8. The method of claim 1, wherein performance of the operation comprises executing, by the managing entity, a cloud services operation on behalf of the managed service.

9. The method of claim 1, further comprising:
in response to detecting an error related to the managed service, determining that the management operation record information published to the fifth block does not match the management request information published to the third block; and
in response to determining that the management operation record information published to the fifth block does not match the management request information published to the third block, generating a notification on the first computing device associated with the managing entity indicating an inconsistency between the management operation record information published to the fifth block and the management request information published to the third block.

10. The method of claim 1, further comprising:
publishing to the first block of the distributed ledger system, by the first computing device associated with the managing entity, metadata including steps that need to be taken to perform the operation specified in the request to perform the operation the a managed service; and
in response to identifying, by the second computing device associated with the managed service, the metadata of the first block of the distributed ledger system, publishing to the third block of the distributed ledger system, by the second computing device associated with the managed service, additional information including information required for the managing entity to adequately perform the operation request for the managing entity.

11. A computer system comprising:
one or more processors;
one or more non-transitory computer-readable media storing instructions which, when executed by the one or more processors, cause:
receiving, at a first computing device associated with a managing entity, a request to perform an operation of a managed service;
publishing to a first block of a distributed ledger system, by the first computing device associated with the managing entity, identification information of the managing entity;
identifying, by a second computing device associated with the managed service, the identification information published to the first block of the distributed ledger system;
publishing to a second block of the distributed ledger system, by the second computing device associated with the managed service, acknowledgement information comprising an indication that the identification information of the managing entity published to the first block was received and verified;
publishing to a third block of the distributed ledger system, by the second computing device associated with the managed service, management request information comprising an operation request for the managing entity;
identifying, by the first computing device associated with the managing entity, the management request information published to the third block of the distributed ledger system;
publishing to a fourth block of the distributed ledger system, by the first computing device associated with the managing entity, management request acknowledgment information comprising an indication that the management request information of the third block was received; and
in response to a performance of an operation included in the management request information published to the third block, publishing to a fifth block of the distributed ledger system, by the first computing device associated with the managing entity, management operation record information including a history of operations performed by the managing entity.

12. The computer system of claim 11, wherein the distributed ledger system comprises a permissioned distributed ledger accessible by authorized entities, wherein the authorized entities comprise at least one of the managing entity or the managed service.

13. The computer system of claim 11, wherein the request to perform the operation comprises a request for the managing entity to initiate and complete a cloud services operation.

14. The computer system of claim 11, wherein each block of the distributed ledger system comprises metadata indicating access control permissions.

15. The computer system of claim 11, wherein each block of the distributed ledger system is accessible for a period of time specified in each respective block.

16. The computer system of claim 11, further comprising allowing access to the management operation record information published to the fifth block of the distributed ledger system for a period specified in the fifth block.

17. The computer system of claim 11, further comprising restricting access to each block of the distributed ledger system to a physical location that is specified in each respective block.

18. The computer system of claim 11, wherein performance of the operation comprises executing, by the managing entity, a cloud services operation on behalf of the managed service.

19. The computer system of claim 11, further comprising:
in response to detecting an error related to the managed service, determining that the management operation record information published to the fifth block does not match the management request information published to the third block; and
in response to determining that the management operation record information published to the fifth block does not match the management request information published to the third block, generating a notification on the first computing device associated with the managing entity indicating an inconsistency between the management operation record information published to the fifth block and the management request information published to the third block.

20. The computer system of claim 11, further comprising:
publishing to the first block of the distributed ledger system, by the first computing device associated with the managing entity, metadata including steps that need to be taken to perform the operation specified in the request to perform the operation the a managed service; and
in response to identifying, by the second computing device associated with the managed service, the metadata of the first block of the distributed ledger system, publishing to the third block of the distributed ledger system, by the second computing device associated with the managed service, additional information including information required for the managing entity to adequately perform the operation request for the managing entity.

* * * * *